United States Patent [19]
Hayton

[11] Patent Number: 6,109,663
[45] Date of Patent: Aug. 29, 2000

[54] JOINT SEAL FOR A GAS TURBINE ENGINE EXHAUST DUCT

[75] Inventor: Paul R Hayton, Bristol, United Kingdom

[73] Assignee: Rolls-Royce, PLC, London, United Kingdom

[21] Appl. No.: 09/179,425

[22] Filed: Oct. 27, 1998

[30] Foreign Application Priority Data

Dec. 3, 1997 [GB] United Kingdom .................. 9725471

[51] Int. Cl.⁷ .................................................. F16L 27/00
[52] U.S. Cl. .......................................... 285/272; 285/184
[58] Field of Search .................. 239/265.19, 265.25, 239/265.35; 285/184; 277/631

[56] References Cited

U.S. PATENT DOCUMENTS

| | | | |
|---|---|---|---|
| 2,933,891 | 4/1960 | Britt | 239/265.35 |
| 3,245,693 | 4/1966 | Way | 277/631 |
| 3,418,809 | 12/1968 | Kopp | 239/265.35 |
| 3,525,475 | 8/1970 | Schweikl | 239/265.35 |
| 3,624,737 | 11/1971 | Keller | 239/265.19 |
| 4,549,753 | 10/1985 | Nuytten | |
| 4,606,561 | 8/1986 | Jackson | |
| 5,156,420 | 10/1992 | Bokor et al. | 285/184 |

FOREIGN PATENT DOCUMENTS

| | | |
|---|---|---|
| 1050896 | 12/1966 | United Kingdom |
| 1 417 400 | 12/1975 | United Kingdom |
| 1 504 885 | 3/1978 | United Kingdom |

*Primary Examiner*—Lynne H. Browne
*Assistant Examiner*—Aaron Dunwoody
*Attorney, Agent, or Firm*—Oliff & Berridge, PLC

[57] ABSTRACT

A joint seal for articulated joints between contra-rotating sections of a gas turbine engine exhaust duct. The illustrated embodiment comprises a plurality of contra-rotatable exhaust duct sections leading to a vectorable final nozzle. The joint seal is located internally of a bearing around its inner circumference. An exhaust section may have an internal wall spaced internally from the outer wall, thus forming an annular space for conducting relatively cool air surrounding the hot gas stream. The joint seals preferably are located between adjacent ends of these inner walls.

8 Claims, 2 Drawing Sheets

JOINT SEAL FOR A GAS TURBINE ENGINE EXHAUST DUCT

BACKGROUND OF THE INVENTION

The invention concerns a rotatable joint seal. In particular the invention relates to a ring seal for a joint between relatively rotatable sections of pipe conveying gas, for example a gas turbine engine exhaust duct.

SUMMARY OF THE INVENTION

The particular embodiment with respect to which the invention will be described below involves a joint between adjacent scarf-jointed sections of a jet pipe which may be relatively rotated in order to vector the final exhaust nozzle. The jet pipe is normally provided with a liner which, amongst other things, serves for heat insulation and pressure fluctuation damping. In a straight section of pipe the liner can be made in a continuous length, or section permanently joined to be effectively continuous. A problem arises where there is a break in the liner, for example, to accommodate relatively movable jet pie sections the problem of hot gas incursion into the gap between the liner and the jet pipe wall. The present invention is intended to provide a solution to this problem.

According to a broad aspect of the invention a seal between a plurality of generally cylindrical members articulated together comprises a closed loop wiper lying in the plane of the articulated joint and carried by a first of articulated members and wiping against a hoop carried by a second of the articulated members.

In one form of the invention the articulated members are each rotatable about respective axes intersecting in the plane of the joint.

In a particular form of the invention the cylindrical members comprises sections of the jet pipe of a gas turbine engine. The final section carries a nozzle which may be vectored in predetermined plane, say a vertical plane, by contra-rotating sections of the jet pipe. In this arrangement there are several such joints and the lane of each joint is disposed at an oblique angle with respect to the rotational axis of each section.

BRIEF DESCRIPTION OF THE INVENTION

FIG. 1 shows the exhaust, vectoring system of a lift/propulsion engine capable of providing thrust for both normal wing borne flight and for lift. It is to be understood that the drawing does not illustrate a complete lift/thrust system for an aircraft having vertical lift, or vectoring, capability.

Figure 1:
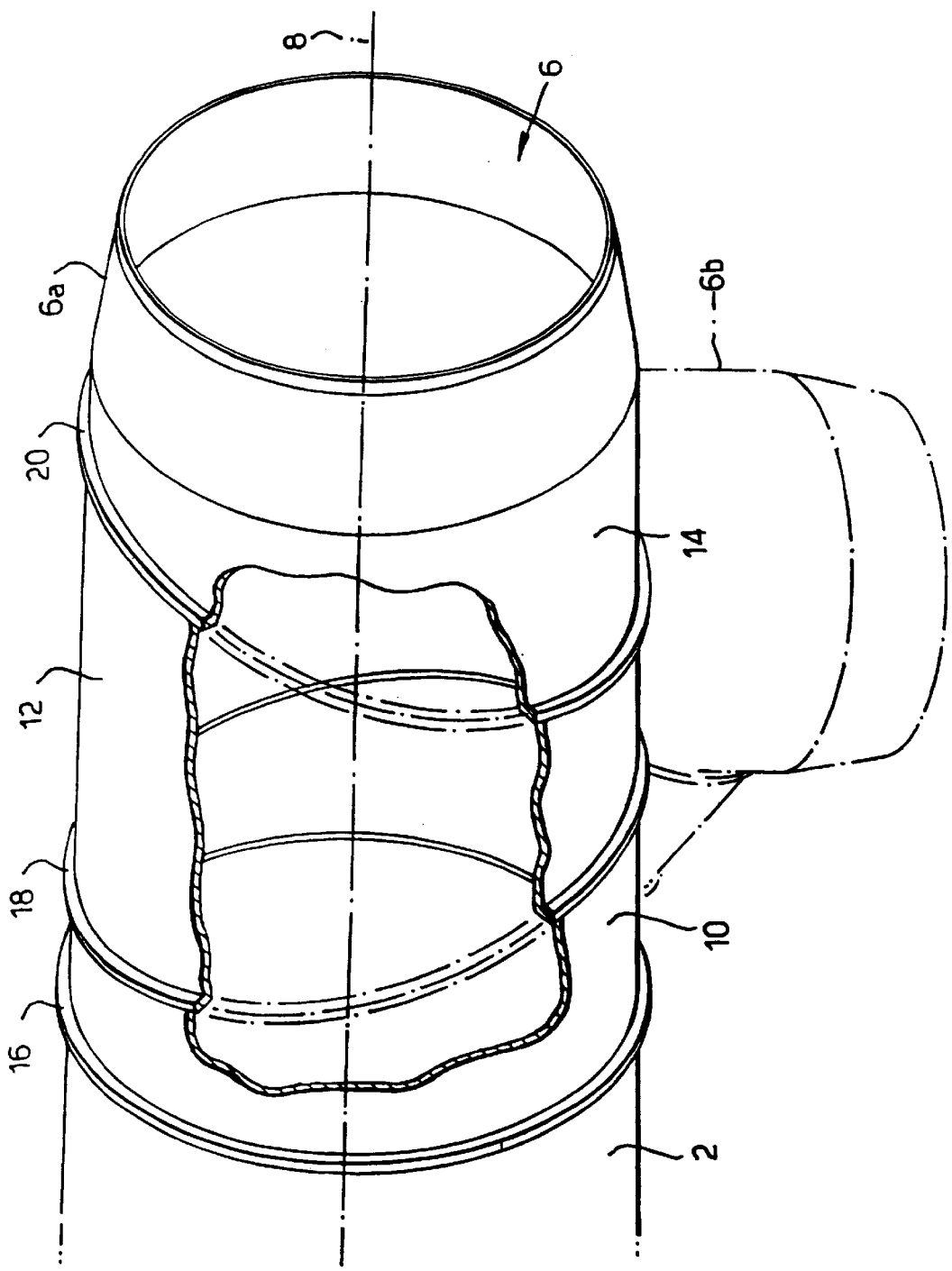
FIG. 1 is a partly cut-away perspective view of a three section, swivelable jet pipe and nozzle.

The downstream end of a turbine exhaust casing, or jet pipe, is illustrated at 2, and a single vectorable exhaust nozzle is shown at 6. The nozzle 6 is shown in solid line 6a in the axial thrust, or cruise, position and in the vertical lift, or vectored, position by dashed lines 6b. The jet pipe has a centre axis 8 which is also the axis of the nozzle 6 in the undeflected position. Between the turbine exhaust casing 2 and the nozzle 6 lie three section mutually rotatable 10, 12 and 14 connected together at three rotatable angled joints 16,18,20 the joint faces of which are angled in such a way that when the sections are counter-rotated the nozzle moves from a "horizontal" position 6a (solid line) to a "vertical" position 6b (dashed line). The terms "horizontal" and "vertical" as used here do not necessarily indicate the absolute spatial orientation of the nozzle 6, rather they are used in a sense to indicate the relative positioning of the nozzle. In this sense "horizontal" refers to the nozzle position in which the nozzle axis and engine axis are aligned, and "vertical" refers to the nozzle position in which the nozzle axis lie roughly at a right angle to the engine axis.

The upstream rotatable joint 16 is located at the downstream end of the jet pipe or casing 2 and is disposed in a plane perpendicular to the axis of the jet pipe. The first rotatable nozzle section 10 is mounted at its upstream end on the joint 16 for rotation about the jet pipe axis. The downstream end of the pipe section 10 carries the joint 18 in an oblique plane with respect to the original jet pipe axis. The pipe section 12 has both its ends formed in oblique planes which converge, this in side view the section 12 appears wedge-shaped. The upstream end of section 12 is defined by one side of the oblique rotatable joint 18 and the downstream end is similarly defined by one side of the second obliquely angled, rotatable joint 20. Finally the nozzle 6 is carried by a short pipe section 14 the upstream end of which is defined by one side of the angled joint 20. By rotating pipe sections 10 and 14 in one direction relative to the casing 2 and counter-rotating the mid-section 12 the final nozzle 6 may be vectored from the axial thrust to vertical thrust position, and vice-versa. Meanwhile, by synchronised rotations the thrust vector itself is restrained to move in a single plane which, in normal orientation, is a vertical plane.

Thus, there are three joints in the jet pipe/nozzle assembly which may provide escape paths for exhaust gas leakage.

All of the faces of the joints are circular, or annular, in the plane of the joint and contain a bearing arrangement and a seal. The normal shape of the exhaust duct is cylindrical but, where adjacent sections are expected to vector one relative to the other in a transverse plane upon contra-rotation, circularity is only retained in the joint itself. In order to obtain the relative angular movement of one part relative to the other the joint plane has to be formed at an oblique angle relative to the cylindrical axes of the adjacent sections. Thus although circularity is retained in the plane of the joint a projection of the joint onto a plane perpendicular to the cylinder axis reveals the walls of the duct have to transform from circular to elliptical as in the joints 18,20. In the art this is well understood. The prime movers and drive trains for producing the contra-rotative movements are not shown in the drawings.

Figure 2:
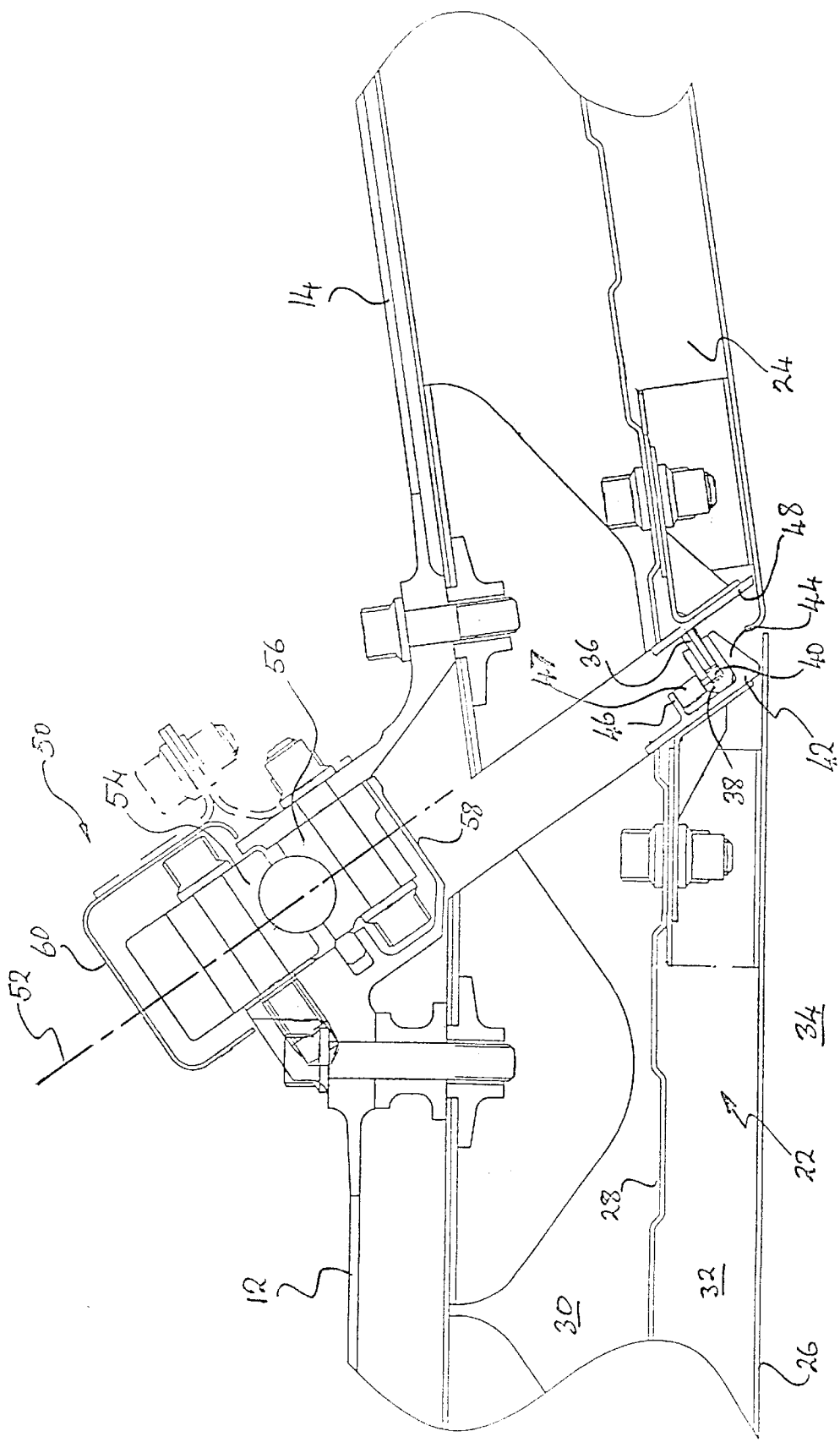
FIG. 2 is a cross section, detail view through one of the swivel joints in FIG. 1.

Referring now to FIG. 2 it will be immediately apparent the various jet pipe sections comprise an outer casing, and an inner, double-skinned jet pipe liner. This drawings illustrates a detail view on a cross-section through one of the oblique joints, by way of example the oblique joint between contra-rotatable sections 12,14 is shown. The jet pipe sections 12,14 carry internal lines assemblies which are generally indicated at 22,24 respectively. The liners in the two sections are essentially identical. Each comprises an inner skin 26 which defines the turbine exhaust gas path, and an outer skin 28 spaced part radially from the inner skin. Similarly the outer skin 28 is spaced part from the wall of the jet pipe sections 12,14. The liner skins 26,28 lie concentrically or near concentrically with their respective jet pipe casing sections 12,14 thereby forming co-axial annular passageways which are used, in operation, to conduct a proportion of cool bypass air along the wall of the jet pipe/nozzle assembly. This air supply has the dual function of cooling the jet pipe casing, the final exhaust nozzle, and cooling the skin 28. The liner skins 26,28 are perforated to provide controlled cool air flow from the radially outermost annular space 30 adjacent the jet pipe into the annular space 32 between the inner and outer skins 26,28 and thence through the skin 26 into the exhaust duct space 34.

The seal is located adjacent the inner liner skins 26,28 and is effective to prevent interchange of the gas streams in the spaces 30 and 34. In particular, the seal guards against the flow of cooling air from 30 to 34.

The joint seal comprises an endless wiper member 36 in the form of a split-ring which housed and located by a second endless member 38 of U-shaped cross-section. The U-shaped member 38 is in the form of a closed-loop member the cross-section of which is disposed such that the U-shape constitutes a channel open in an axial direction. The split-ring wiper member 36 is housed within and located by the U-shaped channel. The dimensions and disposition of these parts 36,38 is such that the wiper member 36 is movable axially relative to its receiving hoop member 38. A plurality of additional springs 40 are located in the base of the U-shaped channel of member 38 underneath the wiper member 36. These springs 40 are arranged to urge the member 36 in an axial direction causing it to protrude from the open side of the channel.

The U-shaped channel member 38 is, in turn, located against one side of a hoop-shaped mounting plate or segmented collar 42 arranged in or parallel to the plane of the articulated joint. The collar segments are self-supporting and 42 carry an upstanding inner margin or flange 44 which acts as an end stop to prevent buckling surge pressure on the segments 42. A second flange 46 is also arranged on the same side of the collar 42 spaced outwardly (in the plane of the joint) a short distance from the flange 46. The U-shaped channel and wiper assembly 36,38,40 is mounted on the collar 42 and held in place against the flange 46 by a further plurality of springs 47. This collar 42 is attached to one end of one of the cylindrical duct members. In FIG. 2 it is shown bolted to the inner skin 28 with the obliquely angled collar 42 effectively closing the gap between the skins 26,28 at one end of the member. The joint seal is disposed with the wiper member 36 being urged in a direction towards an adjacent cylindrical duct member.

The said adjacent duct member carries a second segmented collar 48 similarly mounted at the end of the member confronting the wiper member 36. The surface of collar 48 facing the wiper assembly is flat and arranged in the plane of the articulated joint and is spaced from the first mounting collar 42 by a short distance. This spacing is such that the tip of the wiper member 36 is urged into contact with the face of the second collar 48 around all its circumference by the springs 40. Thus, when the cylindrical duct members are rotated relatively in order, for example, to vector an exhaust nozzle 6 between positions 6*a* and 6*b* in FIG. 1, then the wiper assembly and collars maintain a continuous gas seal around the whole circumference.

The two contra-rotatable sections of FIG. 2 are mounted one relative to the other by means of a bearing assembly indicated generally at 50. The plane of the bearing is indicated by a broken line 52 which, as will be apparent from the drawing, lies at an oblique to the axial direction of the exhaust duct sections. The outer wall 12 of the upstream exhaust section is attached to the outer race 54 of bearing 50, and the outer wall 14 of the downstream exhaust section is attached to the inner race 56. The bearing is shielded in the illustrated example by an inner shield 58 and an outer shield 60.

The endless wiper member 36 is comprised preferably of material capable of withstanding its immediate environment for a substantial period and over a number of operating cycles. In the main, temperature capability and tolerance to prolonged exposure to exhaust duct gases are critical and a suitable metal or metal alloy such as nickel is a favoured choice for a one piece sold wiper. In another form of embodiment the member 36 may comprise a brush seal constructed of conventionally used materials such as a stainless steel alloy. The circular brush seal may be constructed as a single component, or alternatively, as a set of part-circular segments with appropriate inter-segment seals for example strip seals.

In a brush seal used as a seal between relatively rotatable components the individual seal bristles or tufts are normally circumferentially inclined in the direction of rotation. This has an advantage of reducing resistance and bristle tip wear but is effective only where rotation is unidirectional. Since there is always a tendency for the bristles to be deflected in the direction of rotation reversals of direction would result inevitably in resistance to the change and increased wear. It may be preferred, therefore, to avoid this problem by mounting the bristles without any circumferential lean but, instead, inclining the whole seal at a slight cone angle relative to the plane of collar 48 so as to avoid the peak of resistance to a change of direction.

It will be readily apparent that still further variations are possible within the scope of the invention. For example, the wiper member 36 as mentioned may comprise a plurality of component parts such as segments which are assembled together to function effectively as a single component. It will have been understood that the wiper member 36 preferably describes a circular locus on the face of the plane of the collar 48. However, it may not in all cases be necessary for member 36 to be a true circle so that as it may comprise a plurality of segments, these individual components may be linear so that where there is a sufficient number the assembly may approximate to a circle.

What is claimed is:

1. A gas turbine exhaust duct comprising a plurality of relatively rotatable duct members, a joint seal between duct members articulated together comprises a first collar means in the plane of the articulated joint and carried by a first of the articulated members, at least one endless wiper member carried by a second collar means carried by the second of the articulated members, the wiper member sprung parallel with the axis of the second collar to engage the first collar creating a sealing plane parallel to or in the plane of the joint.

2. A gas turbine engine exhaust duct including a joint seal as claimed in claim 1, wherein the members duct members are each rotatable about respective axes which intersect in a plane containing, or parallel to, the seal surface of the annular collar means.

3. A gas turbine engine exhaust duct including a joint seal as claimed in claim 1 wherein the plane of the joint is disposed at an oblique angle with respect to the rotational axes of the cylindrical members.

4. A gas turbine engine exhaust duct including a joint seal as claimed in claim 1 wherein said at least one endless wiper member is a split ring.

5. A gas turbine engine exhaust duct including a joint seal as claimed in claim 1 wherein the or each endless wiper member is sprung towards the adjacent collar.

6. A gas turbine engine exhaust duct including a joint seal as claimed in claim 5 wherein the or each endless wiper member is located by and housed in a U-shaped channel member.

7. A gas turbine engine exhaust duct including a joint seal as claimed in claim 6 wherein the or each endless wiper member is spring-loaded in the channel member in the direction of a confronting second collar means.

8. A gas turbine engine exhaust duct including a joint seal as claimed in claim 1 wherein the joint is disposed at an oblique angle relative to the axes of the duct members.

* * * * *